United States Patent [19]

Matsumoto

[11] 3,922,691
[45] Nov. 25, 1975

[54] ELECTRONIC SHUTTER FOR PHOTOGRAPHIC CAMERA
[75] Inventor: Kunio Matsumoto, Ageo, Japan
[73] Assignee: Copal Company Limited, Tokyo, Japan
[22] Filed: Dec. 17, 1973
[21] Appl. No.: 425,291

[30] Foreign Application Priority Data
Dec. 20, 1972 Japan.............................. 47-127973

[52] U.S. Cl. ................. 354/51; 343/225; 354/234; 354/267
[51] Int. Cl.².. G03B 7/08; G03B 9/58; G03B 17/40
[58] Field of Search ........... 354/131, 133, 234, 266, 354/267, 295, 67, 48, 50, 51; 340/221; 343/225; 352/179; 95/53 E, 53 EA, 53 EB

[56] References Cited
UNITED STATES PATENTS
| | | | |
|---|---|---|---|
| 3,363,250 | 1/1968 | Jacobson | 340/221 X |
| 3,636,850 | 1/1972 | Kikuchi et al. | 354/234 |
| 3,641,902 | 2/1972 | Kikuchi et al. | 354/234 X |
| 3,686,672 | 8/1972 | Ishizuka | 343/225 |

Primary Examiner—Samuel S. Matthews
Assistant Examiner—Kenneth C. Hutchison
Attorney, Agent, or Firm—Cushman, Darby & Cushman

[57] ABSTRACT

An electronic shutter for photographic cameras comprising a built-in receiving device which generates an output signal upon the reception of a wireless control signal in order to remotely control the opening and closing of the shutter. An electromagnet which opens and closes the shutter when it is energized and deenergized is connected to the receiving device when the receiving device is in stand-by condition for receiving a control signal, and then, when said electromagnet is energized by the output signal from the receiving device, connected to the exposure time control circuit which can control the energization and deenergization of the electromagnet.

4 Claims, 3 Drawing Figures

ELECTRONIC SHUTTER FOR PHOTOGRAPHIC CAMERA

BACKGROUND OF THE INVENTION

1. Field of the Invention

The present invention relates to an electronic shutter for a photographic camera and, more particularly, to a remotely controllable electronic shutter arranged to be opened and closed by a wireless signal from a position distant from the camera by utilizing the self-contained electro-magnet.

2. Description of the Prior Art

It is known in the prior art to remotely control a camera by a wireless signal from a position distant from the camera. In these arrangements there has been provided a shutter relaease button depressing device comprising a wireless signal receiver and an electromagnetic plunger controlled by the receiver. Such a device was mounted at the top of the camera as a device independent of the camera body, even when the camera itself is provided with an electronic shutter, and the shutter release button of the camera has been depressed by actuating the shutter release button depressing device by means of the wireless signal from a transmitter. This kind of shutter release button depressing device, however, has disadvantages as described below. That is, as said kind of shutter release button depressing device comprises an electro-magnetic plunger which serves to push down the release button instead of a man's finger, it requires a comparatively large amount of electric power and, consequently, an electric power source has to be provided separately from the electric power source exclusively used for the shutter release button depressing device for the electronic shutter and the device as a whole becomes very large. Moreover, it is very inconvenient or troublesome to carry such a large shutter release button depressing device along with the camera.

SUMMARY OF THE INVENTION

It is, therefore, the principal object of the present invention to provide an electronic shutter for a photographic camera capable of carrying out opening and closing of the shutter by remote control without requiring an attachment independent of the camera such as a shutter release button depressing device.

Another object of the present invention is to provide an electronic shutter which is economical and operates reliably comprising an electro-magnet for controlling the opening and closing operations of the shutter, which is connected to an exposure-time control circuit provided with a delaying circuit having a photo-electric element and capacitor and with a switching circuit comprising at least one switching element and connected to said delaying circuit; said electro-magnet being used also as a remote control means for the shutter.

Still another object of the present invention is to provide an electronic shutter capable of ordinary photographing by depressing the shutter release button of the camera and capable of photographing by remote control without requiring any change-over operation.

According to the present invention, said objects and further objects can be attained by providing a receiving means, which generates an output signal by receiving a wireless control signal from the transmitter, and by relationally connecting the electro-magnet, which is connected to the exposure-time control circuit and controls opening and closing of the shutter, to said receiving means under the stand-by condition for receiving and to the exposure-time control circuit at the same time when receiving said control signal.

BRIEF DESCRIPTION OF THE DRAWINGS

Other objects and features of the present invention will become apparent to those skilled in the art as the disclosure is made in the following description of a preferred embodiment of the invention, as illustrated in the accompanying drawings, in which.

DETAILED DESCRIPTION OF THE PREFERRED EMBODIMENTS

Figure 1:
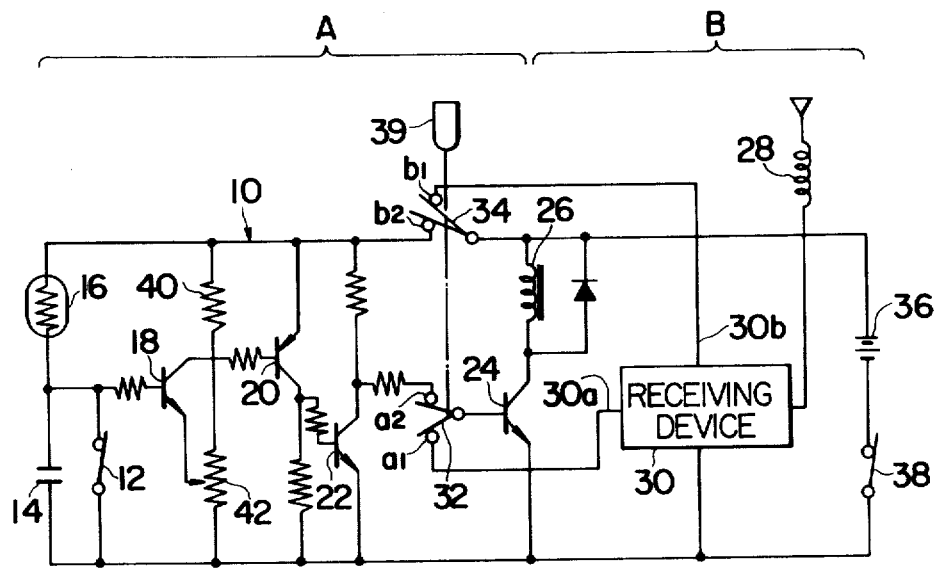
FIG. 1 shows an electric circuit diagram of the electronic shutter according to the present invention.

Referring to the drawings, especially to FIG. 1, an electric circuit 10 of te electronic shutter according to the present invention comprises an exposure-time control circuit portion A and a remote-control circuit portion B. The exposure-time control circuit portion A comprises a delaying circuit comprising a capacitor 14, to which a trigger switch 12 to be opened by opening motion of the shutter not illustrated here is connected in parallel, and a photo-conductive element 16 connected to the capacitor 14 in series. A switching circuit comprising switching transistors 18, 20, 22 and 24 is connected said delaying circuit, and an electro-magnet 26 is connected to the transistor 24 of said switching circuit. The remote-control circuit portion B comprises a receiving device 30 having an output terminal 30a and power input terminal 30b, to which a receiving antenna 28 is connected, the switching transistor 24 and the electro-magnet 26. That is, the switching transistor 24 and electro-magnet 26 are commonly used for both of the exposure-time control circuit portion A and remote-control circuit portion B. To describe in further detail, the switching transistor 24 and electro-magnet 26 are included in the remote-control circuit portion B when two switches 32 and 34, which are changed over by energization of the electro-magnet 26, are respectively connected to contacts $a_1$ and $b_1$, i.e., when the electro-magnet 26 is not energized. When the electro-magnet 26 is energized and switches 32 and 34 are respectively changed over to contacts $a_2$ and $b_2$, the switching transistor 24 and electro-magnet 26 are included in the exposure-time control circuit portion A. Electric power for the exposure-time control circuit portion A and remote-control circuit portion B is supplied by the power battery 36, which is in common to both circuit portions, through the power switch 38. The electro-magnet 26 is of a double-head type having one end faced to a ratch member for preventing the movement of a shutter opening member, which is not illustrated, and the other end engaged with a ratch member for preventing the movement of the shutter closing member. As examples of such relative mechanisms between the double-head type electro-magnet and the shutter are described in the detail in U.S. Pat. No. 3,636,850 and U.S. Pat. No. 3,641,902, detailed description is omitted here.

The operation of the electronic shutter according to the present invention is as described below. When the film is wound up and the shutter is charged, the trigger switch 12 is closed and switches 32 and 34 are respectively positioned to contacts $a_1$ and $b_1$ because the electro-magnet 26 is not energized. When the power switch 38 is closed in the above condition, the remote-control circuit portion B is formed. If, however, a control signal is not given from the transmitter (not illustrated), no output at the output terminal 30a of the receiving device 30 and, therefore, the transistor 24 is in OFF condition. Consequently, the electro-magnet 26 is kept unenergized and positions of the switches 32 and 34 are also kept unchanged as illustrated by solid lines in FIG. 1. That is, FIG. 1 shows the stand-by condition for receiving the signal under which the remote-control circuit portion B is formed.

When a wireless control signal for starting of photographing is transmitted from the transmitter, which is not illustrated, under the above-mentioned stand-by condition for signal receiving, the receiving device 30 receives the signal through the antenna 28 and, an output signal of positive polarity generated at the output terminal 30a of the receiving device 30. As a result, the switching transistor 24 is turned ON and the electromagnet 26 is energized. Therefore, the ratch member for preventing the movement of the shutter opening member is attracted at one end of said electro-magnet and the shutter is opened. At the same time, change-over switches 32 and 34 are changed over from contacts $a_1$ and $b_1$ to contacts $a_2$ and $b_2$, and the exposure-time control circuit portion A is formed. Besides, at the same time when the shutter opens as above, the trigger switch 12 cooperating with said shutter opening member opens.

During the time when said change-over switches 32 and 34 are respectively changed over from contacts $a_1$ and $b_1$ to contacts $a_2$ and $b_2$, the switching transistor 24 and electro-magnet 26 are instantaneously disconnected from the power source 36 and, consequently, the former is turned OFF and the latter is de-energized. This condition, however, lasts only for an extremely short time, i.e., about 200 sec. and, therefore, the change-over switches 32 and 34 are changed over reliably by means of residual magnetism of the electro-magnet 26. At the moment when the switches 32 and 34 are changed over to contacts $a_2$ and $b_2$, the switching transistor 24 is turned ON again because it is biased in forward direction and the electro-magnet 26 is energized. Consequently, the change-over switches 32 and 34 are respectively kept connected to contacts $a_2$ and $b_2$. On the other hand, when the trigger switch 12 is kept closed, the switching transistor 18 is in OFF condition because its base potential is kept at ground potential by the trigger switch 12 and, therefore, transistors 20 and 22 are also in OFF condition. At the same moment as the trigger switch 12 is opened, the capacitor 14 is charged at a rate proportional to the resistance value of the photoconductive element 16 which corresponds to brightness of the object to be photographed. Thus, the base potential of the switching transistor 18 is raised gradually. When said base potential reaches a pre-determined value, the transistor 18 is inverted to ON condition, transistors 20 and 22 are also inverted to ON condition, the transistor 24 is inverted to OFF condition and the electro-magnet 26 is de-energized. Consequently, the shutter closing member (not illustrated) is released from the electromagnet 26 and the shutter is closed.

By connecting the shutter release button 39 of the camera to the change-over switches 32 and 34 as shown in FIG. 1 and by arranging so that the switches 32 and 34 are changed over respectively from contacts $a_1$ and $b_1$ to contacts $a_2$ and $b_2$ during the pushing-down process of the shutter release button 39, it is possible to carry out ordinary photographing by pushing down only the shutter release button without providing any other additional manual change-over means.

Figure 2:
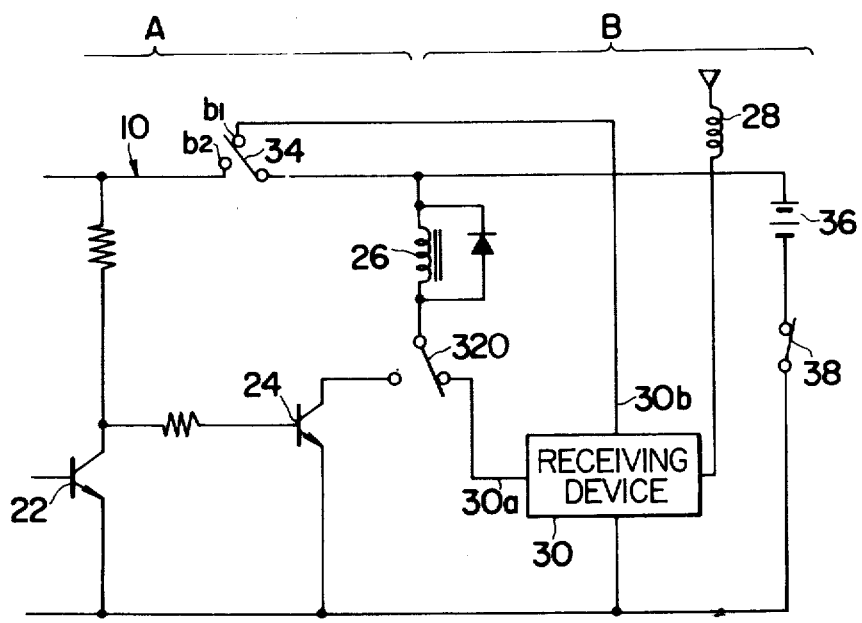
FIG. 2 shows a part of the electric circuit diagram of another embodiment of the present invention.
Figure 3:
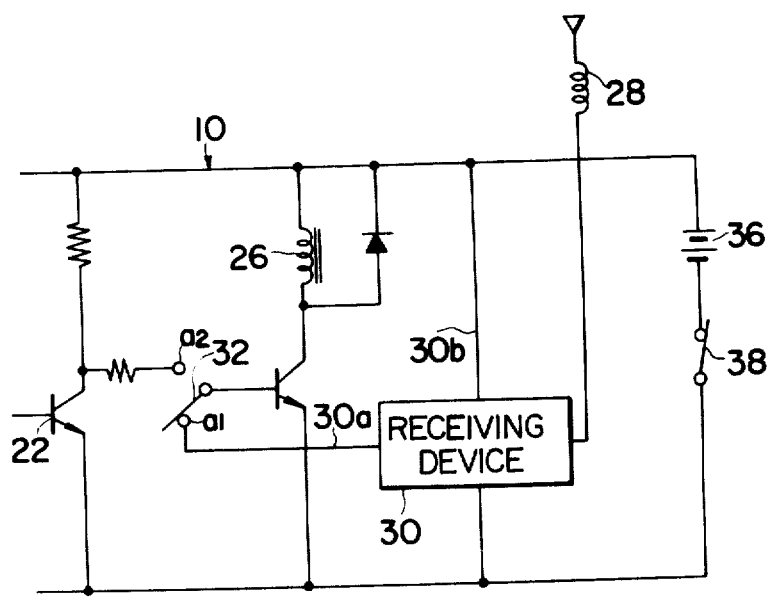
FIG. 3 shows a part of the electric circuit diagram of still another embodiment of the present invention.

In the above-mentioned embodiment, the switching transistor 24 is also used in common to the exposure-time control circuit portion A and remote-control circuit portion B. However, as shown in FIG. 2, it is also possible to arrange to include the switching transistor 24 always in the exposure-time control circuit portion A, by directly connecting the base of the switching transistor 24 to the contact $a_2$ shown in FIG. 1, and to connect electro-magnet 26 to the collector of the switching transistor 24 and output terminal 30a of the receiving device by a switch 320 equivalent to the change-over switch 32. In this case, it is to be so arranged that the output potential of the output terminal 30a is the ground potential. On the other hand, the change-over switch 34 is provided also for the purpose of saving the current which flows, for example, through the power switch 38, voltage dividing resistors 40 and 42, etc., in the exposure-time control circuit portion A. It is also possible to omit the changeover switch 34 by connecting the contact $b_2$ in FIG. 1 directly to the power source 36 as shown in FIG. 3 provided that it is so arranged that a mis-operation will not occur for the power switch 38. In that case, the power terminal 30b of the receiving device 30 may be directly connected to the power source 36.

I claim:

1. An electronic shutter means for photographic cameras comprising a shutter, an electromagnet coupled to said shutter means for energizing said electromagnet so that said shutter is open when said electromagnet is energized and closed when said electromagnet is deenergized, an exposure time control circuit coupled to said electromagnet upon energization thereof and functioning to maintain said energized electromagnet in an energized condition and thereafter to deenergize said electromagnet after a time delay, a receiving device having a stand-by condition and responsive to a wireless control signal in said stand-by condition for generating an output signal, means responsive to said output signal for energizing said electromagnet energizing means when said receiving device receives a wireless control signal, and a change-over switch means coupling said electromagnet when it is deenergized to said receiving device, said change-over switch means being switched by energization of said electromagnet to thereby couple said electromagnet to said exposure time control circuit, said change-over switch means thereby connecting said electromagnet with said receiving device when said receiving device is in a stand-by condition for receiving the wireless control signal and with said exposure time control circuit in response to said receiving device receiving the wireless control signal.

2. An electronic shutter means for photographic cameras according to claim 1, including a switching circuit having a plurality of transistors and wherein:

said exposure time control circuit comprises
a delaying circuit having a series connected photoelectric resistance element and a capacitor, said delaying circuit connected to said switching circuit, the resistance of said photo-electric resistance element being dependent upon ambient light level and said resistance element together with said capacitor forming an RC circuit for fixing the time delay during which the electromagnet is energized, said switching circuit coupling said delay circuit to said electromagnet upon energization thereof and said delay circuit functioning to maintain said energized electromagnet in an energized condition and thereafter to deenergize said electromagnet after a time delay.

3. An electronic shutter means for photographic cameras according to claim 1, wherein there is included a shutter release button and said change-over switch means is coupled to said shutter release button of the camera so that the switching operation of said change-over switch means can also be carried out by the depression of said shutter release button.

4. An electronic shutter means for photographic cameras according to claim 1, further comprising:
a power supply, an additional switching means coupling said power supply to said exposure time control circuit, said additional switching means controlled by the energization of said electromagnet, so as to interrupt electric power from said power supply to said exposure time control circuit when said receiving device is in said stand-by condition.

* * * * *